United States Patent [19]

Young

[11] Patent Number: 4,626,417

[45] Date of Patent: Dec. 2, 1986

[54] METHODS FOR CHEMICALLY REDUCING NITROGEN OXIDES

[75] Inventor: Donald C. Young, Fullerton, Calif.

[73] Assignee: Union Oil Company of California, Los Angeles, Calif.

[21] Appl. No.: 673,359

[22] Filed: Nov. 20, 1984

Related U.S. Application Data

[63] Continuation-in-part of Ser. No. 537,087, Sep. 29, 1983, abandoned.

[51] Int. Cl.$^4$ .......................... C01B 21/00; B01J 8/00
[52] U.S. Cl. ................................... 423/235; 423/239; 423/351
[58] Field of Search .................... 423/235, 235 D, 239, 423/239 A, 351

[56] References Cited

U.S. PATENT DOCUMENTS

| | | | |
|---|---|---|---|
| 3,565,575 | 2/1971 | Warshaw | 423/235 |
| 3,801,696 | 4/1974 | Mark | 423/235 |
| 3,826,810 | 7/1974 | Lawson | 423/239 |
| 4,061,597 | 12/1977 | Goldstein et al. | 423/235 |
| 4,119,702 | 10/1978 | Azuhata et al. | 423/235 |
| 4,325,924 | 4/1982 | Arand et al. | 423/235 |

FOREIGN PATENT DOCUMENTS

| | | | |
|---|---|---|---|
| 2442828 | 3/1975 | Fed. Rep. of Germany | 423/235 |
| 48-1296 | 1/1973 | Japan | 423/235 |
| 49-29277 | 3/1974 | Japan | 423/235 |
| 49-33880 | 3/1974 | Japan | 423/235 |
| 50-8769 | 1/1975 | Japan | 423/235 |
| 50-8770 | 1/1975 | Japan | 423/235 |
| 50-73870 | 6/1975 | Japan | 423/235 |
| 51-5263 | 1/1976 | Japan | 423/235 |
| 52-29491 | 3/1977 | Japan | 423/235 |
| 53-33975 | 3/1978 | Japan | 423/235 |
| 53-62774 | 6/1978 | Japan | 423/235 |
| 53-76974 | 7/1978 | Japan | 423/235 |
| 53-112273 | 9/1978 | Japan | 423/235 |
| 53-115658 | 10/1978 | Japan | 423/235 |
| 54-43471 | 12/1979 | Japan | 423/235 |
| 186985 | 11/1966 | U.S.S.R. | |

*Primary Examiner*—Gregory A. Heller
*Attorney, Agent, or Firm*—Dean Sandford; Gregory Wirzbicki; Michael H. Laird

[57] ABSTRACT

Methods are provided for chemically reducing one or more oxides of nitrogen by contacting the nitrogen oxides with a composition containing a urea-sulfuric acid component having a urea-sulfuric acid molar ratio below 2. The urea-sulfuric acid component can be either solid or molten, or it can be dissolved in a suitable solvent. Particularly preferred compositions are those which have relatively low water concentrations and which are characterized by $H_2O/(urea+H_2SO_4)$ molar ratios below about 2.5.

These methods can be employed to prevent or reduce the emission of nitrogen oxides from liquid systems and to convert nitrogen oxides contained in vapor streams to non-toxic materials, e.g. elemental nitrogen and water. Solutions of the urea-sulfuric acid components which are employed to remove nitrogen oxides from vapor streams may also contain surfactants which facilitate gas-liquid contacting.

56 Claims, 1 Drawing Figure

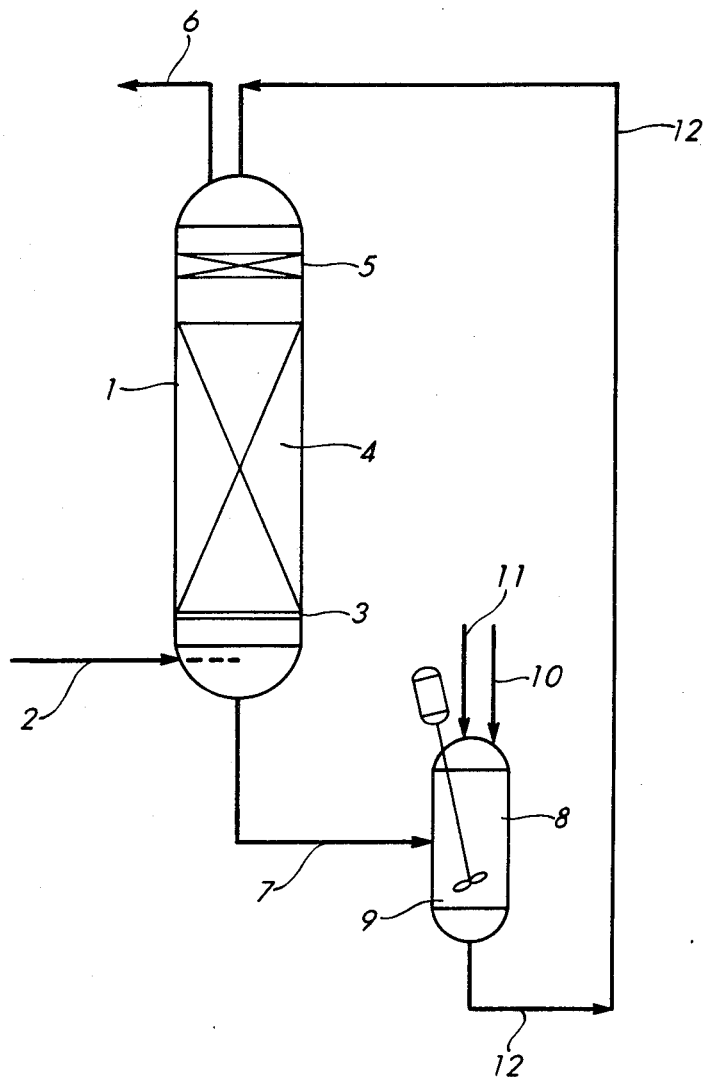

METHODS FOR CHEMICALLY REDUCING NITROGEN OXIDES

BACKGROUND OF THE INVENTION

1. Field of the Invention

This invention relates to the field of nitrogen oxide emission control, and, in particular, it relates to methods for chemically reducing nitrogen oxides and thereby reducing the emission of such oxides to the atmosphere or otherwise.

2. Description of the Art

Several nitrogen oxides are employed in and/or are produced by a variety of processes and are known to constitute undesirable emissions to the work place and environment. Nitrogen oxides which are employed in or are produced by chemical processes include nitrous oxide ($N_2O$), nitric oxide (NO), nitrogen trioxide ($N_2O_3$), nitrogen tetraoxide [$NO_2$ or $(NO_2)_2$], and nitrogen pentaoxide ($N_2O_5$). Numerous processes emit one or more of such nitrogen oxides. Illustrative of such processes are relatively high temperature fuel combustion systems, e.g. systems which operate at flame temperatures of 870° C. or more, and a variety of chemical processes including the manufacture and concentration of nitric acid; processes involving the nitration of organic compounds in either liquid or vapor phase by reaction of the organic compounds with nitric oxide or nitric acid; nitric acid or nitric oxide containing metal-treating systems widely employed for pickling, etching and descaling ferrous metal articles such as wire and metal plate; and processes for the recovery of metals such as copper, molybdenum, gold, platinum, palladium, and other metals or compounds from their respective alloys or ore concentrates. Precious metals such as gold and platinum are frequently recovered from their alloys by treatment with aqua regia, and copper and molybdenum compounds such as the sulfides and sulfates are frequently recovered from ore concentrates by treatment with concentrated nitric acid. Electric discharge processes such as electric discharge metal machining and welding and certain high intensity light sources such as carbon electrode lights are also known to emit nitrogen oxides, although such processes are not generally considered to be major contributors of nitrogen oxides to the environment. The principal contributors to nitrogen oxide emissions are nitric acid manufacture and concentration systems, metal-treating systems, and fuel combustion systems such as power plants, industrial fuel and waste burners and automotive vehicles.

The U.S. government has established standards for maximum emissions of nitrogen oxides of all types from the major nitrogen oxide sources, and several state governments have enacted even more stringent regulations.

Presently, nitrogen oxide emissions can be controlled by several processes including absorption, adsorption, catalytic reduction, and selective reduction, and by modifying fuel burners including industrial and automotive burners and engines. Adsorption systems are usually employed to remove nitrogen oxides from vapor streams by contact with molecular sieves. These systems are relatively expensive to install, regenerate, and maintain, and they have relatively limited capacities. Absorption usually involves contact with water and/or an aqueous base such as ammonia, sodium hydroxide and the like.

It is also known that nitrogen oxides can be absorbed in and chemically reduced by aqueous urea solutions. The urea can react with nitrogen oxides absorbed in the solution to chemically reduce them to elemental nitrogen and water. However, such systems have low absorption efficiencies and reaction rates.

The addition of acids to aqueous urea solutions to improve the ability of the solutions to remove nitrogen oxides from gas streams has also been suggested. One such process, disclosed by Warshaw in U.S. Pat. No. 3,565,575, involves the use of solutions which contain about 1 to about 30 grams of dissolved urea per 100 ml of solution together with dissolved free acid in a proportion up to about 10 percent by volume. The use of urea to remove nitrogen oxides from flue gas and to prevent nitrogen oxide emissions from catalyst regeneration at elevated temperatures above the boiling point of water has also been suggested. For instance, Arand et al., U.S. Pat. No. 4,325,924, disclosed that urea can be employed to remove nitrogen oxides from fuel-rich, reducing, flue gas streams at temperatures in excess of 1900° F. while Goldstein et al., U.S. Pat. No. 4,061,597, disclosed that the level of nitrogen oxide emissions from heat treated catalysts can be reduced by conducting such catalyst treatment in the presence of urea at temperatures of about 300° C. and higher.

Catalytic reduction is presently the principal method of controlling nitrogen oxide emissions from industrial fuel burning plants and generally involves the reaction of nitrogen oxides in the exhaust stream with excess fuel in the presence of a catalyst containing a precious metal such as palladium, platinum and/or rhodium. Although catalytic reduction can reduce nitrogen oxide emissions to acceptable levels, it does require certain process modifications such as the use of excess fuel and the consumption of all oxygen in the exhaust stream prior to contacting the catalyst. Such processes have the further disadvantage that they require relatively expensive catalysts which deactivate and are difficult to regenerate. Catalytic reduction also requires relatively high conversion temperatures and thereby results in relatively high exhaust system temperatures.

Selective reduction involves the reaction of nitrogen oxides with ammonia in the presence of a catalyst such as a base metal oxide and is sometimes used for the control of nitrogen oxide emissions from industrial gas-fired equipment. Suitable catalysts include the oxides of calcium, magnesium, platinum, palladium and/or rhodium. Like several other processes, selective reduction requires that oxygen or other oxidants be eliminated from the exhaust stream prior to catalytic treatment and requires close temperature control in the conversion zone. Furthermore, selective reduction is relatively inefficient unless the more expensive metal catalysts such as platinum, palladium and rhodium are employed, and even these catalysts gradually deactivate and are difficult to regenerate.

Automotive nitrogen oxide emissions can be reduced by catalytic reduction using relatively expensive platinum, palladium and/or rhodium catalysts on a solid support such as alumina. These systems suffer from the disadvantages associated with high exhaust temperatures and the necessity of eliminating oxygen from the exhaust stream prior to catalytic treatment. Other procedures for reducing nitrogen oxide emissions in automotive exhausts include reducing or eliminating spark advance, at least under some engine operating conditions, reducing air-fuel ratio, exhaust gas recycle, and the like, all of which significantly diminish engine performance and efficiency.

Most of the processes referred to above require the use of relatively large installations to achieve adequate efficiency and nitrogen oxide emission levels and often cannot be economically justified, particularly for small industrial operations. Also, many existing nitrogen oxide emitting facilities cannot be easily modified to accommodate an emission control system of the required efficiency. For instance, it is not always possible to modify an existing facility to assure the presence of excess fuel and to remove all oxygen from the exhaust as required for efficient operation of the catalytic and selective reduction processes referred to above. Accordingly, a need exists for improved methods for reducing nitrogen oxide emissions.

It is therefore one object of this invention to provide improved processes for reducing nitrogen oxide emissions.

Another object of this invention is the provision of methods for converting nitrogen oxides to elemental nitrogen and water.

Yet another object of this invention is the provision of relatively inexpensive yet efficient methods for reducing or preventing the emission of nitrogen oxides.

Another object is the provision of improved methods for preventing the emission of nitrogen oxides from liquid systems.

Another object is the provision of improved methods for preventing the emission of nitrogen oxides from nitric acid-containing solutions and/or from solutions employed to effect the nitration of organic compounds.

Another object is the provision of improved methods for removing nitrogen oxides from vapor streams.

Other objects, aspects and advantages of this invention will be apparent to one skilled in the art in view of the following disclosure, the drawing, and the appended claims.

SUMMARY OF THE INVENTION

This invention provides methods for preventing the emission of nitrogen oxides which are contained in liquids or gases by contacting the nitrogen oxide or oxides with a composition which contains a urea-sulfuric acid component which has a urea/sulfuric acid molar ratio below 2. Particularly preferred compositions have relatively low water concentrations and are characterized by $H_2O/(urea+H_2SO_4)$ molar ratios below about 2.5, which compositions exhibit even greater efficiency for the removal of nitrogen oxides from gas streams and for the prevention of nitrogen oxides emissions from liquid systems. The urea-sulfuric acid component can be employed either as a solid, a melt, or as a solution of the urea-sulfuric acid component in water or other suitable solvent, and the solutions can optionally contain one or more surfactants which facilitate nitrogen oxide removal from gas streams.

The urea-sulfuric acid component converts nitrogen oxides to elemental nitrogen and water. Thus, nitrogen oxides can be removed from vapor streams by contact with a melt, solution or solid urea-sulfuric acid components, and the emission of nitrogen oxides from liquid systems can be prevented or reduced by maintaining the useful urea-sulfuric acid components in the liquid phase. Nitrogen oxide conversion rate is markedly increased, and conversion efficiency is improved, by increasing acid concentration, and the efficiency of gas-liquid contacting, when employed, can be improved by reducing the urea-sulfuric acid solution or melt viscosity and/or reducing the surface tension of the solution.

The methods of this invention exhibit several significant advantages in comparison to methods available in the art. The urea-sulfuric acid components employed in the methods of this invention rapidly eliminate nitrogen oxides either from gas streams or from liquid systems apparently by the rapid catalytic conversion of nitrogen oxides to elemental nitrogen and water. Thus, they markedly reduce the size and expense of operating equipment which is required to control nitrogen oxide emissions. In particular, the urea-sulfuric acid components useful in this invention, which have urea/sulfuric acid molar ratios below 2, are much more active and efficient for the removal of nitrogen oxides from vapor streams and for the prevention of nitrogen oxide emissions from liquid systems than are the combinations of urea and acids disclosed in U.S. Pat. No. 3,565,575. The preferred compositions employed in the methods of this invention which have $H_2O/(urea+H_2SO_4)$ molar ratios below about 2.5 are even more active and efficient nitrogen oxide mitigating agents.

The useful urea-sulfuric acid components are relatively inexpensive items of commerce; thus, their use for the removal of nitrogen oxides markedly reduces the cost of such emission control. Use of the preferred urea-acid components in which the urea-acid molar ratio is at least about one reduces operating and maintenance costs by reducing acid corrosivity and activity and increasing the nitrogen oxide conversion rate, particularly at relatively high acid concentrations. Since urea is the only constituent consumed in the conversion of nitrogen oxides in accordance with this invention (the acid is not consumed), and since urea is an inexpensive item of commerce, the use of such urea-acid components further contributes to the economies in material and operating costs associated with the invention. The useful urea-acid components rapidly convert nitrogen oxides at atmospheric pressure and at a relatively wide range of operating temperatures (including ambient temperature), and the chemical conversions involved in the methods of this invention do not involve any significant exotherms or endotherms. Therefore, the methods of this invention do not require elaborate heating, cooling, or temperature control systems; nor do they require the use of elevated temperatures or heat resistant equipment such as that required in catalytic processes known in the art.

Unlike several of the currently available nitrogen oxide control methods referred to above, the methods of this invention do not necessitate any significant modification of the nitrogen oxide emitting process. The urea-sulfuric acid components can be employed to remove nitrogen oxides from liquids and gases containing a variety of other materials including excess oxygen, fuels, reactants and/or other substances.

Urea significantly reduces acid corrosivity and activity (other than proton donating activity), particularly in the urea-sulfuric acid components preferred in the methods of this invention in which the urea/acid molar ratio is at least about 1. Thus, the useful urea-sulfuric acid components can be employed to treat liquid and vapor systems which contain organic and/or inorganic materials which are normally very reactive toward free acids. Such materials are much less reactive toward the urea-sulfuric acid components useful in this invention. Furthermore, since the useful urea-sulfuric acid components can be added directly to existing nitrogen oxide emitting liquid systems, and since the efficiency of the useful urea-sulfuric acid components for removing nitrogen oxides from vapor systems is not significantly affected by the size of vapor-liquid contacting equipment, the equipment required to effect adequate nitrogen oxide emission control can be economically tailored to existing processes of essentially any size.

BRIEF DESCRIPTION OF THE DRAWING

The invention will be more readily understood by reference to the drawing which is a schematic illustration of a vapor-liquid contacting apparatus useful for removing nitrogen oxides from vapor streams in accordance with one embodiment of this invention.

DETAILED DESCRIPTION OF THE INVENTION

This invention provides methods for chemically reducing nitrogen oxides, for converting nitrogen oxides to elemental nitrogen and water, and for the preventing the emission of nitrogen oxides to the work place and/or to the environment. In accordance with one embodiment of this invention, the nitrogen oxides are contacted with a urea-sulfuric acid component under conditions which facilitate and catalyze the reaction of nitrogen oxides with urea to produce elemental nitrogen, water, and $CO_2$.

The useful urea-sulfuric acid components have urea/sulfuric acid molar ratios below 2. Particularly preferred components have $H_2O/(urea+H_2SO_4)$ molar ratios below about 2.5 and can be essentially or completely anhydrous. Urea is consumed during the process. The sulfuric acid, which is not consumed, apparently facilitates adsorption of nitrogen oxides into the urea-sulfuric acid component and catalyses and thereby accelerates nitrogen oxide conversion.

Nitrogen oxides of any type from any source, either in solution or in vapor form, can be chemically converted by treatment in accordance with this invention. Illustrative of nitrogen oxides which can be converted by reaction with the urea-sulfuric acid components useful in this invention are nitrous oxide ($N_2O$), nitric oxide (NO), nitrogen trioxide ($N_2O_3$), nitrogen tetraoxide ($NO_2$), and nitrogen pentaoxide ($N_2O_5$), either alone or in any combination. One or more of such nitrogen oxides may be removed from a vapor stream containing the same by contact with a solution, melt or solid form of the useful urea-sulfuric acid component. In the alternative, the nitrogen oxides may be formed in a solution containing the urea-sulfuric acid component such as in the decomposition of nitric acid, or they may be introduced into a solution containing the urea-sulfuric acid component such as in nitrating procedures which frequently involve the use of nitrous oxide or other nitrogen oxide reactants.

The nitrogen oxide-containing vapor or liquid treated in accordance with this invention may also contain any other compound or compounds which do not interfere, by reaction or otherwise, with the urea-sulfuric acid component. Thus, a vapor or liquid containing nitrogen oxide which can be treated in accordance with this invention may also contain oxygen, carbon monoxide, carbon dioxide, hydrocarbons such as hydrocarbon fuels, organic and/or inorganic reactants, and other vaporous or liquid reactants, products and/or by-products. It is essential only that the liquid nitrogen oxide-containing system to be treated be capable of dissolving the urea-sulfuric acid component or that the nitrogen oxide contained in the vapor stream be absorbable into a solution of the active urea-sulfuric acid component in a suitable solvent.

Illustrative of vaporous nitrogen oxide-containing sources which can be treated in accordance with the methods of this invention are vapor effluents from (1) nitric acid manufacturing and/or concentrating processes; (2) liquid phase and vapor phase organic nitration reactions such as the reaction of one or more organic compounds with nitric acid or anhydrous nitric oxide; (3) metal and mineral treating processes which involve the use of nitric acid or nitrogen oxides such as metal recovery or treating systems including metal pickling, etching, and descaling; (4) exhausts from high temperature combustion systems such as power plants, industrial and domestic fuel burners, motors, waste burners, automotive and locomotive gasoline and diesel-fueled engines, and the like. Illustrative of liquid-phase systems which can be treated in accordance with these methods are nitric acid-containing solutions employed in the recovery of metals or metal compounds such as gold, platinum, palladium, copper, and molybdenum metals and compounds; liquid phase nitrating baths and the like. Nitrogen oxides emitted by electric discharge processes, including electric discharge machining, welding, high intensity light generation, and the like, may also be converted by treatment in accordance with the methods of this invention.

The urea-sulfuric acid components useful in the methods of this invention can be either solid or liquid combinations of urea and sulfuric acid in which the urea/sulfuric acid molar ratio is less than 2. Particularly preferred urea-sulfuric acid components are those which have relatively low water contents, and these can be substantially or completely anhydrous. The preferred components which have low water concentrations are characterized by $H_2O/(urea+H_2SO_4)$ molar ratios below about 2.5, and such compositions are significantly more effective for the removal of nitrogen oxides from gas streams and for the prevention of nitrogen oxide emissions from nitrogen oxide-emitting solutions. The useful liquid compositions can be either melts or solutions which contain the described urea-sulfuric acid component in the presence or absence of other components. Such compositions will usually contain at least about 1 weight percent, typically about 5 to about 75 weight percent urea, and at least about 1 weight percent, typically about 5 to about 70 weight percent sulfuric acid.

I have found that, regardless of the absolute concentration of urea and sulfuric acid, urea-sulfuric acid components in which at least some of the sulfuric acid is present as the monourea adduct of sulfuric acid are substantially more effective and efficient for the removal of nitrogen oxide from gas streams and for the prevention of nitrogen oxide emissions from liquid and solid systems. Accordingly, the useful urea-sulfuric acid components are those which have urea/sulfuric acid molar ratios below 2, and preferably below about 1.5. Although the useful compositions can contain excess sulfuric acid, i.e., sulfuric acid which is not complexed with urea as either the mono- or diurea adduct, such compositions are more corrosive than those in which all of the sulfuric acid is complexed as either the mono- or diurea adduct, and they are more hydroscopic. For these reasons, the most preferred urea-sulfuric acid components have urea/sulfuric acid molar ratios of about 1 or more and less than 2. The use of urea-sulfuric acid components having urea/sulfuric acid molar ratios within this preferred range provides for rapid and efficient $NO_x$ conversion yet mitigates many of the undesirable side reactions associated with the presence of free sulfuric acid. The presence of sufficient urea to convert all of the sulfuric acid to the monourea adduct, or to a combination of the mono- and diurea adducts, attenuates essentially all chemical activity of the sulfuric acid other than its protonating activity. This effect essentially eliminates, or at least greatly reduces, the oxidizing and sulfonating activity of the sulfuric acid, and thereby reduces corrosivity and minimizes or eliminates acid reactions with other components of the treated liquid or vapor. For instance, many liquids and vapors which can be treated in accordance with this invention contain organic compounds which can react with sulfuric acid to form undesirable by-products, consume acid, foul process equipment, and generate heat of reaction which may complicate temperature control and heat removal.

The solutions of urea-sulfuric acid components useful in the methods of this invention contain the described urea-sulfuric acid components dissolved in a solvent, or mixture of solvents, having sufficient affinity for the urea-sulfuric acid component to provide the desired concentration of urea and sulfuric acid in the solution.

Conversion rate depends, in part, on urea concentration. Thus, the urea concentration in the solution should be sufficient to provide the desired conversion rate. Urea concentrations are typically at least about 1 weight percent, usually about 5 weight percent, and generally within the range of about 5 weight percent up to the urea solubility limit under operating conditions. Preferred urea concentrations are usually within the range of about 5 to about 75, and most preferably about 5 to about 60 weight percent.

Within the limits of urea and acid concentrations discussed immediately above, the acid concentration in the useful urea-sulfuric acid component solutions will usually be at least about 1 weight percent, and preferably from about 5 weight percent up to the solubility limit in the solvent and at the operating temperature employed. Typical acid concentrations are within the range of about 5 to about 70, preferably about 5 to about 60 weight percent, and should be sufficient to produce a solution pH, in aqueous systems, below 7, generally about 6 or less, preferably 3 or less, and most preferably about 1 or less.

Taking all of the above-described factors into account, the solutions which are most preferred, particularly for scrubbing nitrogen oxides from vapor streams, are solutions which contain relatively high concentrations of urea and sulfuric acid. In such solutions, the urea and sulfuric acid, in combination, will usually constitute at least about 2, preferably at least about 5, and most preferably at least about 10 weight percent of the solution. Suitable solutions will usually contain about 5 to about 95 and preferably about 10 to about 90 weight percent of the combination of urea and sulfuric acid. The most active solutions are those in which the urea and sulfuric acid, in combination, constitute at least about 30, preferably at least about 60 weight percent of the solution.

Solutions in which the urea and sulfuric acid, in combination, constitute at least 60 weight percent of the solution are particularly preferred when water is the only solvent employed. I have found that combinations of the useful urea-sulfuric acid components and water in which the $H_2O/(urea+H_2SO_4)$ molar ratio is less than 2.5 are significantly more active and efficient for the removal of $NO_x$ from vapor streams then are compositions in which that molar ratio is greater than 2.5. Without being constrained to any particular theory explaining this effect, and without limiting the scope of this invention, it appears that the presence of sufficient water to provide 3 or more moles of water per mole of urea and 2 or more moles of water per mole of sulfuric acid (the amounts of water required to hydrate those respective components) somehow attenuates the activity of the urea-sulfuric acid component for the conversion of nitrogen oxides, possibly by completely hydrating both the urea and sulfuric acid constituents. Three moles of water per mole of urea and 2 moles of water per mole of sulfuric acid corresponds to an $H_2O/(urea+H_2SO_4)$ molar ratio of 2.5 at a urea/sulfuric acid molar ratio of 2, and the useful compositions of this invention have urea/sulfuric acid molar ratios below 2. Furthermore, compositions having urea/sulfuric acid molar ratios of 2 and $H_2O/(urea+H_2SO_4)$ molar ratios of 2.5 contain approximately 38 weight percent water, 34 weight percent urea, and 28 weight percent sulfuric acid (in the absence of other constituents, i.e., based on the combined weight of water, urea, and sulfuric acid). Thus, the preferred condition for water-containing solutions of the useful urea-sulfuric acid components—that such solutions have $H_2O/(urea+H_2SO_4)$ molar ratios below 2.5—is analogous to the requirement that the urea and sulfuric acid, in combination, constitute at least about 60 weight percent of the solution. Even more concentrated solutions are presently preferred since they more rapidly remove nitrogen oxides from gas streams and more effectively prevent the emission of nitrogen oxides from nitrogen oxide-emitting solutions. Thus, while compositions having $H_2O/(urea+H_2SO_4)$ molar ratios below 2.5 are preferred, compositions having such molar ratios below 2 and even below 1 are even more effective for the purposes of this invention.

The useful solutions may also contain one or more surfactants and/or corrosion inhibitors. Surfactants reduce surface tension and thereby, in some instances, increase the rate of nitrogen oxide absorption from vapor streams. Corrosion inhibitors which are particularly suitable for use with solutions which contain urea and sulfuric acid are discussed in my copending applications Ser. Nos. 330,904, now U.S. Pat. No. 4,404,116 and 331,001, now U.S. Pat. No. 4,402,852 both of which were filed Dec. 15, 1981 and which are incorporated herein by reference.

The urea-sulfuric acid component solutions useful in the methods of this invention can be prepared by mixing urea and the selected solvent(s), if any, and sulfuric acid under conditions which are sufficient to avoid excessive heating of the solution due to the heat of dilution and adduct formation. The heats of dilution and adduct formation of urea with sulfuric acid is so great that the amount of heat released (particularly in the manufacture of more concentrated sulfuric acid solutions) can cause the mixture to boil, explode, and/or exceed the thermal decomposition temperature of urea, acid, or the urea-acid adduct. Procedures suitable for manufacturing even the most concentrated solutions of urea and strong acids and for determining incipient decomposition temperature are discussed in my copending applications Ser. Nos. 318,343, now U.S. Pat. No. 4,397,675 and 318,629, now U.S. Pat. No. 4,445,925, both of which were filed Nov. 5, 1981 and which are incorporated herein by reference. While those applications were specifically directed to the manufacture of concentrated aqueous urea-sulfuric acid solutions, the procedures described therein can also be employed to control the substantial exotherms involved in the production of urea-sulfuric acid components in other solvents. Methods suitable for producing substantially anhydrous urea-sulfuric acid components useful in the methods of this invention and, in particular, such components which contain less than about one weight percent water, are disclosed in my copending application Ser. No. 673,508, filed Nov. 20, 1984, for Thermally Stable Urea-Sulfuric Acid Compositions and Methods of Manufacture, the disclosure of which is incorporated herein by reference.

The solvent in which the urea and sulfuric acid are dissolved should have a sufficient affinity for both the urea and acid to dissolve the desired proportions of each component and should not be reactive with the urea, the acid or components of the nitrogen oxide-containing system to be treated. Illustrative of suitable solvents are polar solvents such as water, dimethyl sulfoxide (DMSO), methanol, glycol, methylethyl ketone (MEK), tetrahydrofuran, halogenated compounds, e.g., trichloromethane, and the like. Solutions of urea in excess sulfuric acid, with or without additional solvent, can also be employed. Water is the most preferred solvent due to its affinity for both urea and acids and its lack of reactivity with urea, sulfuric acid, and most components of nitrogen oxide-containing liquids and/or vapors.

Solid and molten urea-sulfuric acid components can also be employed to reduce nitrogen oxide emissions in accordance with this invention. Such solids and melts can be obtained by procedures capable of producing a solvent-free combination of urea and sulfuric acid including solidification of a urea-sulfuric acid melt, crystallization from solution, vacuum evaporation of the solvent, and atmospheric or vacuum dessication. Melts can be formed directly from urea and sulfuric acid by reacting these two components in the absence of solvent at a temperature sufficient to maintain a molten system.

The solid urea-sulfuric acid components can be obtained by crystallization from their respective solutions by procedures similar to those described in my copending application Ser. No. 444,667, "Methods for Controlling Vegetation," filed Nov. 26, 1982, which is incorporated herein by reference. As described in that application, the urea-sulfuric acid solution there referred to as 18-0-0-17 has a crystallization temperature of 50° F. Designations such as 18-0-0-17 are conventionally used in the agricultural industry to define the weight percentages of nitrogen, phosphorus, potassium and a fourth component, in this case sulfur, contained in a composition. Thus 18-0-0-17 contains 18 weight percent nitrogen as urea, 0 percent phosphorus, 0 percent potassium, and 17 weight percent sulfur. The 18-0-0-17 solution has a urea/sulfuric acid molar ratio of about 1.2 and contains about 90 weight percent of a combination of urea and sulfuric acid. Urea and sulfuric acid, in combination, constitute 80 weight percent of the aqueous solution designated as 10-0-0-19 in copending application Ser. No. 444,667, which composition has a urea/sulfuric acid molar ratio of about 0.6 and which crystallizes at about 42° F. The aqueous solution designated as 9-0-0-25 comprises approximately 96 weight percent of a combination of urea and sulfuric acid, has a urea/sulfuric acid molar ratio of about 0.4, and crystallizes at 14° F. The indicated crystallization temperatures of the three urea-sulfuric acid aqueous solutions referred to immediately above, and the crystallization temperatures for other formulations of urea and sulfuric acid useful in the methods of this invention are illustrated, in part, by the isotherms in the ternary phase diagram for urea, sulfuric acid and water in the drawing accompanying copending application Ser. No. 444,667. The crystallization temperatures for other urea-sulfuric acid combinations can be determined from that drawing or by cooling the selected solution until crystallization occurs. The crystallized material can be separated from the supernatant aqueous phase by any suitable solid-liquid separation technique such as filtration, centrifugation, decanting, and the like, and the recovered damp solid can be dried by evaporation if desired.

Since lower crystallization temperatures are required to separate the desired urea-sulfuric acid component from the more dilute solutions, it is preferable to begin with more concentrated solutions having higher crystallization points such as the 18-0-0-17 composition which contains only about 10 percent water. More concentrated solutions, and those having higher crystallization temperatures, e.g., 77° F., are even more preferred since less cooling is required to obtain a similar quantity of the urea-sulfuric acid component.

Substantially anhydrous solid compositions can be obtained by washing the dried, crystallized urea-sulfuric acid component with a strongly hydrophillic solvent such as absolute ethanol or acetone. Ten to 100 weight parts solvent per weight part solute are usually adequate for this purpose. Other methods for producing substantially anhydrous solid urea-sulfuric acid components are disclosed in my above identified application Ser. No. 673,508 for Thermally Stable Urea-Sulfuric Acid Compositions and Methods of Manufacture.

The solvent-free solid and molten urea-sulfuric acid components will usually contain at least one mole of urea per mole of acid. While excess acid may be present in the urea-sulfuric acid melts, it is presently unpreferred since free acid increases corrosivity and the probability of acid side-reactions. Free acid also tends to liquefy the urea-acid components and, for that reason, is preferably avoided when solid urea-sulfuric acid components are desired.

Urea-sulfuric acid components supported on a non-reactive support can also be employed to reduce the emission of nitrogen oxides from either liquids or vapors in accordance with this invention. Illustrative of suitable supports are the variety of amorphous and crystalline metal oxides and other materials conventionally employed as chemical and refinery process catalysts and/or catalyst supports such as activated carbon, alumina, silica, beryllia, zirconia, etc., and combinations of such materials such as silica-alumina, aluminosilicate zeolites, etc. The supported urea-sulfuric acid components can be easily produced by such procedures as impregnating the support with a solution or melt of the urea-sulfuric acid component and drying or cooling the impregnated support.

In accordance with the methods of this invention, one or more oxides of nitrogen are converted to elemental nitrogen and water by contacting the oxide of nitrogen with the described urea-sulfuric acid components. Specifically, oxides of nitrogen can be removed from a vapor phase containing the same by contacting the vapor phase with the solid or liquid urea-sulfuric acid components, and the emission of nitrogen oxides from process liquids can be minimized or prevented by maintaining a combination of urea and sulfuric acid in the liquid phase such that the liquid phase has a composition corresponding to that of the urea-sulfuric acid component solutions useful in the methods of this invention. The nitrogen oxide conversion can be conducted in the presence of oxygen and/or other gases such as combustion exhaust gases and other process vapor effluents. However, relatively oxygen-free systems are presently preferred since the presence of oxygen increases urea consumption.

While it is not intended that the concepts of this invention should be limited to any particular reaction mechanism, the following chemical expressions are representative of the reactions which take place in the methods of this invention.

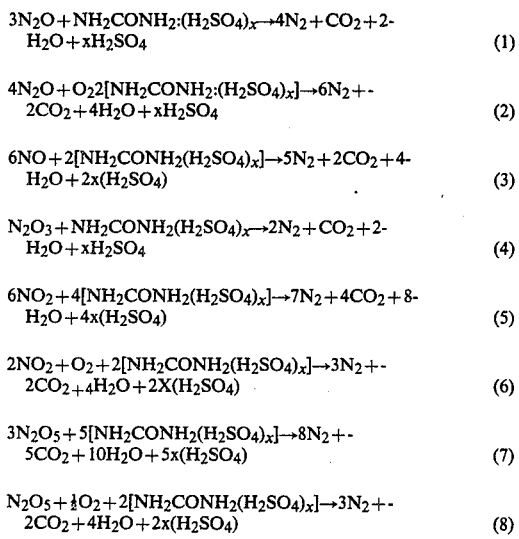

$$3N_2O + NH_2CONH_2\cdot(H_2SO_4)_x \rightarrow 4N_2 + CO_2 + 2H_2O + xH_2SO_4 \quad (1)$$

$$4N_2O + O_2 + 2[NH_2CONH_2\cdot(H_2SO_4)_x] \rightarrow 6N_2 + 2CO_2 + 4H_2O + xH_2SO_4 \quad (2)$$

$$6NO + 2[NH_2CONH_2(H_2SO_4)_x] \rightarrow 5N_2 + 2CO_2 + 4H_2O + 2x(H_2SO_4) \quad (3)$$

$$N_2O_3 + NH_2CONH_2(H_2SO_4)_x \rightarrow 2N_2 + CO_2 + 2H_2O + xH_2SO_4 \quad (4)$$

$$6NO_2 + 4[NH_2CONH_2(H_2SO_4)_x] \rightarrow 7N_2 + 4CO_2 + 8H_2O + 4x(H_2SO_4) \quad (5)$$

$$2NO_2 + O_2 + 2[NH_2CONH_2(H_2SO_4)_x] \rightarrow 3N_2 + 2CO_2 + 4H_2O + 2X(H_2SO_4) \quad (6)$$

$$3N_2O_5 + 5[NH_2CONH_2(H_2SO_4)_x] \rightarrow 8N_2 + 5CO_2 + 10H_2O + 5x(H_2SO_4) \quad (7)$$

$$N_2O_5 + \tfrac{1}{2}O_2 + 2[NH_2CONH_2(H_2SO_4)_x] \rightarrow 3N_2 + 2CO_2 + 4H_2O + 2x(H_2SO_4) \quad (8)$$

Expressions (2), (6) and (8) illustrate that oxygen increases the amount of urea consumed per mole of nitrogen oxide. For instance, expression (5) illustrates that, in the absence of an oxygen source, 4 moles of urea can convert 6 moles of nitrogen tetraoxide to elemental nitrogen and water. Expression (6) illustrates that 2 moles of urea are required to convert only 2 moles of nitrogen tetraoxide in the presence of an oxygen source. Similarly, the conversion of nitrogen pentaoxide in the presence of an oxygen source [expression No. (8)] consumes more urea on a per mole basis than does the conversion which takes place in the absence of an oxygen source [expression No. (7)].

Nitrogen oxides can be removed from a vapor stream by contacting the vapor stream with the useful solid or liquid urea-sulfuric acid components using any vapor-solid or vapor-liquid contacting apparatus, many of which are well known in the art. In the alternative, the emission of nitrogen oxides from liquid process systems, such as organic compound nitrating baths, nitric acid concentrators and nitric acid-containing metal pickling baths, can be minimized or prevented altogether by maintaining urea and sulfuric acid in the solution in proportions useful in the methods of this invention as described above. For instance, urea and sulfuric acid can be added to a nitric acid-containing metal pickling bath in amounts sufficient to provide a concentration of the useful urea-sulfuric acid component in the solution of 2 weight percent or more, and make-up urea can be added periodically or continuously as required due to the consumption of urea by its reaction with nitrogen oxides.

The nitrogen oxide(s) can be contacted with the urea-sulfuric acid component under a wide range of temperatures, pressures, and contact times. Temperature should be maintained at a point below the thermal decomposition temperature of the urea-sulfuric acid component. Aqueous solutions of the mono- and diurea adducts of sulfuric acid begin to decompose at temperatures of approximately 158° F. to 176° F. (depending on composition) and decompose explosively at higher temperatures as discussed in my copending application Ser. No. 318,629 referred to above. The thermally stable, substantially anhydrous urea-sulfuric acid components disclosed in my copending application Ser. No. 673,508 for Thermally Stable Urea-Sulfuric Acid Compositions and Methods of Manufacture, referred to above, are much more thermally stable than are their more hydrous counterparts and can be employed at temperatures above 176° F. and, depending upon composition, even above 212° F. without undergoing decomposition.

The incipient decomposition temperature of any urea-acid solution, solid, or melt, i.e., the temperature at which the composition first begins to decompose, can be readily determined by gradually heating a sample of the composition from ambient temperature and observing the composition for the first signs of effervescence (in the case of solutions) or discoloration and/or vaporization (in the case of solids and melts). Effervescence of a solutions indicates that the urea is beginning to decompose, and the temperature at which effervescence occurs should not be exceeded.

Suitable reaction temperatures will usually be above about 32° F., generally within the range of about 32° to about 300° F., and preferably in the range of about 60° to about 170° F., depending, as mentioned above, on the incipient decomposition temperature of the particular composition employed. Temperatures as high as 300° F. and above can be employed with the anhydrous urea-sulfuric acid solids, melts and non-aqueous solutions. Most conversions can be effectively conducted at temperatures within the range of about 60° to about 150° F., which are easily achieved and which generally do not present any significant hazard of decomposition. Higher contacting temperatures generally promote higher conversion rates.

The desired contacting can be conducted under atmospheric pressure, although higher pressures increase the absorption of nitrogen oxides by the urea-sulfuric acid solutions and melts and adsorption on the solid urea-sulfuric acid components.

Contacting time is usually a significant variable only in those embodiments of this invention which involve vapor-liquid or vapor-solid contacting and should be sufficient to allow intimate contact between the nitrogen oxide-containing vapor and the urea-sulfuric acid component. The reaction between nitrogen oxides and the urea-sulfuric acid component is essentially instantaneous. Thus, relatively high vapor rates and relatively simple contacting apparatus generally afford adequate reduction in nitrogen oxide levels. For instance, nitrogen tetraoxide can be essentially completely removed from a vapor feed stream of technical grade nitrogen tetraoxide by bubbling the technical grade nitrogen tetraoxide through an aqueous solution containing 40 weight percent urea and 30 weight percent sulfuric acid at 70° F. and atmospheric pressure. The effluent gas stream from this treatment has a nitrogen tetraoxide concentration below about 1 ppm.

Any of the various vapor-liquid and vapor-solid contacting techniques can be employed to contact nitrogen oxide-containing vapors with the urea-sulfuric acid solutions, melts and solids useful in this invention. Suitable vapor-liquid contacting procedures include sparging the nitrogen oxide-containing gas stream through a stirred or unstirred solution, spray tower contacting, packed tower contacting, and the like. Similarly, nitrogen oxide-containing gas streams can be contacted with a solid urea-sulfuric acid component contained in a canister, packed column, or other suitable vapor-solid contacting apparatus.

A preferred embodiment of this invention suitable for removing nitrogen oxides from vapor streams is illustrated in the drawing which schematically depicts a packed column 1, urea make-up mixer 8, and ancillary vapor distribution and solution recycle conduits. A nitrogen oxide-containing vapor stream is passed by conduit 2 into packed scrubbing column 1 and upwardly through vapor distributor plate 3 and packing section 4 where it is intimately contacted with a urea-sulfuric acid component solution passing downwardly through the packing section 4. The process stream from which the nitrogen oxides have been removed, containing carbon dioxide, water, elemental nitrogen, and other components of process stream 2 which are not reacted in packing section 4, passes upwardly in the column through demister 5 and exits the column via conduit 6.

The urea-sulfuric acid solution is introduced to column 1 by conduit 12 and is passed downwardly through demister 5, packing 4 and vapor distributing device 3 and exits the column via conduit 7. During passage of the urea-sulfuric acid solution through column 1, some of the urea will be consumed; thus the urea concentration in the solution exiting column 1 via conduit 7 will be lower than the concentration of the solution entering the system via conduit 12. Make-up urea can be added to the scrubber solution as required in any suitable mixing apparatus such as blender 8 which comprises motor-driven impeller 9 and fluid inlet conduits 10 and 11. Conduits 10 and 11 can be employed to introduce urea, acid and/or solvent as required to maintain the concentration of the several components of the urea-sulfuric acid solution at the desired levels.

The invention is further described by the following examples which are illustrative of specific modes of practicing the invention and are not intended as limiting the scope of the invention as defined by the appended claims.

EXAMPLE 1

A steel wire descaling bath containing a solution of 50 weight percent sulfuric acid and 5 weight percent nitric acid in water emits a copious red plume of nitrogen oxides during operation. The bath is treated with 5 pounds of urea per hour per 10,000 pounds of solution during which operation the emission of nitrogen oxides from the solution is completely eliminated as indicated by the absence of fumes.

EXAMPLE 2

Technical grade nitrogen tetraoxide can be completely converted to elemental nitrogen and water by sparging the nitrogen tetraoxide at a rate of 1 liter per hour into 500 ml. of an aqueous solution containing 20 weight percent urea and 28 weight percent sulfuric acid at ambient pressure and 70° F.

EXAMPLE 3

Air is sparged through a gas dispersion tube at a rate of 90 standard cc./min. through a gas dispersion tube into 500 ml. of a solution containing 40 weight percent sodium nitrite ($NaNO_2$) and 2 weight percent sulfuric acid contained in a 1 liter flask to entrain NO and $NO_2$ generated in the acidified sodium nitrite solution. The air stream containing entrained nitrogen oxides is continuously removed from the flask, sampled to determine nitrogen oxide concentration, and sparged through a gas dispersion tube into 500 ml. of an aqueous solution containing 50 weight percent urea and 0.05 weight percent sulfuric acid contained in a 500 ml. flask. The gas emitted from the surface of the aqueous solution is continuously observed to detect the first indication of brownish vapor escaping from the solution which is an indication of nitrogen oxide breakthrough and the failure of the solution to remove all nitrogen oxides from the gas stream. The dimer of $NO_2$—$N_2O_4$—has a characteristic, intense, reddish brown color which, when present, can be readily observed exiting the aqueous urea-sulfuric acid solution.

The relative proportions of urea, sulfuric acid, and water in the aqueous solution correspond to a urea/sulfuric acid molar ratio of 1663 and an $H_2O/(urea+H_2SO_4)$ molar ratio of 3.35. Analysis of the nitrogen oxide-containing gas entering the aqueous solution establishes the presence of 17 volume percent $NO_x$ in the entering gas. The emission of brownish vapors from the aqueous solution is detected in 20 seconds after the beginning of the run at which time 5.1 cc. of nitrogen oxides have been removed from the gas stream.

EXAMPLE 4

The operation described in Example 3 is repeated with the exception that the aqueous urea-sulfuric acid solution contains 27.0 weight percent urea and 2.7 weight percent sulfuric acid corresponding to a urea/$H_2SO_4$ molar ratio of 16.33 and a $H_2O/(urea+H_2SO_4)$ molar ratio of 8.15. The air stream entering the urea-sulfuric acid solution contains 24 volume percent nitrogen oxides, and breakthrough of brownish vapors from the solution is observed in 15 seconds corresponding to a nitrogen oxide absorption capacity of 5.4 cc.

EXAMPLE 5

The operation described in Example 3 is repeated with the exception that the aqueous urea-sulfuric acid solution contains 32.6 weight percent urea and 49.0 weight percent sulfuric acid corresponding to a urea/$H_2SO_4$ molar ratio of 1.09 and a $H_2O/(urea+H_2SO_4)$ molar ratio of 0.98. The entering gas stream contains 12 volume percent nitrogen oxides and the test solution continuously removes all nitrogen oxides from the gas stream for 600 seconds as indicated by the complete absence of any brownish gas exiting the test solution. The test is arbitrarily terminated prior to breakthrough after 600 seconds at which time 108 cc. of nitrogen oxides have been removed from the feed gas.

EXAMPLE 6

The operation described in Example 3 is repeated with the exception that the urea-sulfuric acid solution contains 26.1 weight percent urea and 39.2 weight percent sulfuric acid corresponding to a urea/sulfuric acid molar ratio of 1.09 and a $H_2O/(urea+H_2SO_4)$ molar ratio of 1.45. The feed gas entering the test solution contains 9.8 volume percent nitrogen oxides. The test solution completely removes all nitrogen oxides from the test solution for 600 seconds after which the test is arbitrarily terminated before $NO_x$ breakthrough. 88 cc. of nitrogen oxides have been removed from the feed gas.

and the test solution completely removes nitrogen oxides from the gas stream for only 25 seconds at which time nitrogen oxides breakthrough is observed and the run is terminated. Only 10 cc. of nitrogen oxides have been removed from the feed gas.

The results of Examples 3 through 10 are summarized in the following table for ease of comparison.

| | REMOVAL OF NITROGEN OXIDES FROM VAPOR PHASE | | | | | | | |
|---|---|---|---|---|---|---|---|---|
| | Concentration, wt. % | | | Mole Ratio | | | Failure | |
| Ex. No. | Urea | $H_2SO_4$ | Water | Urea/$H_2SO_4$ | $H_2O$/(Urea + $H_2SO_4$) | $NO_x$, vol. % | Time, sec. | $NO_x$ Removed, cc. |
| 3 | 50.0 | 0.05 | 50.0 | 1633 | 3.35 | 17 | 20 | 5.1 |
| 4 | 27.0 | 2.7 | 70.3 | 16.33 | 8.15 | 24 | 15 | 5.4 |
| 5 | 32.6 | 49.0 | 18.4 | 1.09 | 0.98 | 12 | 600$^a$ | 108$^a$ |
| 6 | 26.1 | 39.2 | 21.6 | 1.09 | 1.45 | 9.8 | 600$^a$ | 88$^a$ |
| 7 | 19.6 | 29.4 | 51.0 | 1.09 | 4.49 | 33.6 | 135 | 68 |
| 8 | 13.0 | 19.6 | 67.4 | 1.09 | 8.70 | 18.9 | 220 | 62 |
| 9 | 21.7 | 55.1 | 23.2 | 0.64 | 1.40 | 28.5 | 600$^a$ | 256$^a$ |
| 10 | 60.9 | 27.6 | 11.5 | 3.60 | 0.48 | 26.7 | 25 | 10 |

$^a$Terminated before breakthrough.

EXAMPLE 7

The operation described in Example 3 is repeated with the exception that the urea-sulfuric acid solution contains 19.6 weight percent urea and 29.4 weight percent sulfuric acid which corresponds to a urea/$H_2SO_4$ molar ratio of 1.09 and a $H_2O/(urea+H_2SO_4)$ molar ratio of 4.49. The feed gas contains 33.6 volume percent nitrogen oxides, and the test solution completely removes all nitrogen oxides from the feed gas for 135 seconds after which the breakthrough of brownish vapor is observed and the run is terminated. 68 cc. of nitrogen oxides have been removed from the feed gas.

EXAMPLE 8

The operation described in Example 3 is repeated with the exception that the urea-sulfuric acid solution contains 13.0 weight percent urea and 19.6 weight percent sulfuric acid which corresponds to a urea/$H_2SO_4$ molar ratio of 1.09 and a $H_2O/(urea+H_2SO_4)$ molar ratio of 8.70. The feed gas contains 18.9 volume percent $NO_x$ and the test solution completely removes all nitrogen oxides from the feed gas for 220 seconds after which $NO_x$ breakthrough is observed, and the run is terminated. 62 cc. of nitrogen oxides have been removed from the feed gas.

EXAMPLE 9

The operation described in Example 3 is repeated with the exception that the test solution contains 21.7 weight percent urea and 55.1 weight percent sulfuric acid which corresponds to a urea/$H_2SO_4$ molar ratio of 0.64 and a $H_2O/(urea+H_2SO_4)$ molar ratio of 1.40. The feed gas contains 28.5 volume percent nitrogen oxides and the test solution completely removes all nitrogen oxides from the gas stream for 600 seconds after which the run is arbitrarily terminated before $NO_x$ breakthrough. 256 cc. of nitrogen oxides have been removed from the feed gas.

EXAMPLE 10

The operation described in Example 3 is repeated with the exception that the test solution contains 60.9 weight percent urea and 27.6 weight percent sulfuric acid which corresponds to a urea/$H_2SO_4$ molar ratio of 3.60 and a $H_2O/(urea+H_2SO_4)$ molar ratio of 0.48. The feed gas contains 26.7 volume percent nitrogen oxides Comparison of Examples 5–9 to Examples 3, 4, and 10 demonstrates that urea-sulfuric acid components which have urea/sulfuric acid molar ratios below 2 are substantially more effective for the elimination of nitrogen oxides than are compositions which have urea/sulfuric acid molar ratios above 2. Comparison of Examples 5, 6, and 9 to Examples 7 and 8 demonstrates that compositions having $H_2O/(urea+H_2SO_4)$ molar ratios below 2.5 are substantially more effective than are otherwise identical compositions which have $H_2O/(urea+H_2SO_4)$ molar ratios above 2.5.

While particular embodiments of the invention have been described, it will be understood, of course, that the invention is not limited thereto since many obvious modifications can be made and it is intended to include within this invention any such modifications as will fall within the scope of the appended claims.

I claim:

1. A method for reducing an oxide of nitrogen which comprises contacting said oxide of nitrogen with a composition comprising urea and sulfuric acid in which the urea/sulfuric acid molar ratio is below 2 and wherein at least a portion of said urea and sulfuric acid is present as the monourea adduct of sulfuric acid.

2. The method defined in claim 1 wherein said oxide of nitrogen is selected from the group consisting of nitrous oxide, nitric oxide, nitrogen trioxide, nitrogen tetraoxide, nitrogen pentaoxide, and combinations thereof.

3. The method defined in claim 1 wherein said composition comprises a solution of said urea and sulfuric acid.

4. The method defined in claim 3 wherein said solution comprises water and has a pH of about 3 or less.

5. The method defined in claim 3 wherein said solution comprises water and has a pH of about 1 or less.

6. The method defined in claim 1 wherein said composition comprises at least about 1 weight percent of said urea and at least about 1 weight percent of said sulfuric acid.

7. The method defined in claim 1 wherein said composition comprises about 5 to about 75 weight percent of said urea, about 5 to about 75 weight percent of said sulfuric acid, and said oxide of nitrogen is contacted with said composition at a temperature below the thermal decomposition temperature of said composition.

8. The method defined in claim 1 wherein said composition comprises a water-containing solution of said sulfuric acid and said urea comprising at least about 5 weight percent urea, at least 5 weight percent of said sulfuric acid, and at least about 2 weight percent water.

9. The method defined in claim 8 wherein the molar ratio of said urea to said sulfuric acid is at least about 1, and said urea and said sulfuric acid, in combination, constitute at least about 30 weight percent of the said solution.

10. The method defined in claim 8 wherein said urea and said sulfuric acid, in combination, constitute at least 60 weight percent of said solution.

11. The method defined in claim 8 wherein the $H_2O/(urea+H_2SO_4)$ molar ratio in said solution is less than 2.5.

12. The method defined in claim 11 wherein said $H_2O/(urea+H_2SO_4)$ molar ratio is less than 2.

13. The method defined in claim 1 wherein said composition further comprises water, and the $H_2O/(urea+H_2SO_4)$ molar ratio in said composition is less than 2.5.

14. The method defined in claim 1 wherein said oxide of nitrogen is generated in said composition, said composition comprises a solution comprising said urea and said sulfuric acid, and said oxide of nitrogen is contacted with said urea and said sulfuric acid in said solution.

15. The method defined in claim 14 wherein said solution is selected from the group consisting of metal-treating solutions, nitrating solutions, and mineral ore treating solutions.

16. The method defined in claim 14 wherein said urea and said sulfuric acid, in combination, constitute at least about 60 weight percent of said solution.

17. The method defined in claim 14 wherein said composition further comprises water, and the $H_2O/(urea+H_2SO_4)$ molar ratio in said composition is below 2.5.

18. The method defined in claim 1 wherein said composition comprises a substantially solvent-free solid or melt of said urea and sulfuric acid.

19. The method defined in claim 1 wherein the molar ratio of said urea to said sulfuric acid is within the range of about 1 to about 2.

20. The method defined in claim 19 wherein the $H_2O/(urea+H_2SO_4)$ molar ratio in said composition is below 2.5.

21. The method defined in claim 18 wherein said composition comprising said urea and said sulfuric acid is dispersed on a porous support.

22. The method defined in claim 18 wherein said urea and said sulfuric acid, in combination, constitute at least about 60 weight percent of said composition.

23. The method defined in claim 1 wherein said oxide of nitrogen comprises nitric oxide.

24. The method defined in claim 1 wherein said urea and said sulfuric acid, in combination, constitute at least about 30 weight percent of said composition, said composition contains less than about 1 weight percent water, and said oxide of nitrogen is contacted with said composition at a temperature above 80° C.

25. The method defined in claim 24 wherein said oxide of nitrogen is contacted with said composition at a temperature above about 90° C.

26. The method defined in claim 1 wherein at least a portion of the nitrogen in said oxide of nitrogen is reduced to molecular nitrogen.

27. The method defined in claim 1 wherein at least a portion of said oxide of nitrogen and said urea are converted to molecular nitrogen, water, and carbon dioxide.

28. A method for removing an oxide of nitrogen from a gas containing said oxide of nitrogen which method comprises contacting said gas with a composition comprising urea and sulfuric acid in which the urea/sulfuric acid molar ratio is below 2 and wherein at least a portion of said urea and sulfuric acid is present as the monourea adduct of sulfuric acid.

29. The method defined in claim 28 wherein said oxide of nitrogen is selected from the group consisting of nitrous oxide, nitric oxide, nitrogen trioxide, nitrogen tetraoxide, nitrogen pentaoxide, and combinations thereof, and said composition comprises a solution comprising said urea and said sulfuric acid.

30. The method defined in claim 28 wherein said urea and said sulfuric acid, in combination, constitute at least 60 weight percent of said composition.

31. The method defined in claim 29 wherein the $H_2O/(urea+H_2SO_4)$ molar ratio in said solution is less than 2.5.

32. The method defined in claim 28 wherein the molar ratio of said urea to said sulfuric acid is about 1 to 2, said urea and said sulfuric acid, in combination, constitute at least about 5 weight percent of said composition, and said composition comprises a solution comprising said urea and said sulfuric acid.

33. The method defined in claim 28 wherein said gas comprises fuel combustion exhaust.

34. The method defined in claim 28 wherein said gas comprises vapor exhaust from a nitric acid-containing metal ore treating solution.

35. The method defined in claim 28 wherein said gas comprises the vapor effluent from a nitric acid-containing metal ore treating solution.

36. The method defined in claim 28 wherein said composition comprises a substantially solvent-free solid or melt comprising said urea and said sulfuric acid.

37. The method defined in claim 36 wherein said composition is a solid.

38. The method defined in claim 36 wherein said composition is dispersed on a support.

39. The method defined in claim 28 wherein said oxide of nitrogen comprises nitric oxide.

40. The method defined in claim 28 wherein at least a portion of the nitrogen in said oxide of nitrogen is reduced to molecular nitrogen.

41. A method for reducing the emission of an oxide of nitrogen from a solution which otherwise emits said oxide of nitrogen, which method comprises maintaining in said solution urea and sulfuric acid in proportions corresponding to a urea/sulfuric acid molar ratio below 2 and wherein at least a portion of said urea and sulfuric acid is present as the monourea adduct of sulfuric acid.

42. The method defined in claim 41 wherein said solution contains less than about 1 weight percent water, and the temperature of said solution reaches a level above 80° C. during said method.

43. The method defined in claim 42 wherein the temperature of said solution reaches a level above 90° C. during said method.

44. The method defined in claim 41 wherein said sulfuric acid is present in said solution at a concentration of at least about 5 weight percent, said urea is present in said solution at a concentration of at least about 5 weight percent, and the molar ratio of said urea to said sulfuric acid is about 1 to 2.

45. The method defined in claim 44 wherein said urea and said sulfuric acid, in combination, constitute at least about 60 weight percent of said solution.

46. The method defined in claim 44 wherein the $H_2O/(urea+H_2SO_4)$ molar ratio in said solution is below 2.5.

47. The method defined in claim 41 wherein said solution comprises a nitric acid-containing metal-treating solution.

48. The method defined in claim 41 wherein said solution comprises a nitric acid-containing mineral ore treating solution.

49. The method defined in claim 41 wherein said solution comprises an organic compound nitrating solution.

50. The method defined in claim 41 wherein said solution is employed in the manufacture of nitric acid.

51. The method defined in claim 41 wherein said solution is employed in a method for the concentration of nitric acid.

52. A method for converting an oxide of nitrogen to molecular nitrogen, $CO_2$ and water, which method comprises reacting said oxide of nitrogen with a composition comprising urea and sulfuric acid in which composition the molar ratio of said urea to said sulfuric acid is below 2 and wherein at least a portion of said urea and sulfuric acid is present as the monourea adduct of sulfuric acid.

53. A method for reducing an oxide of nitrogen, which method comprises contacting said oxide of nitrogen with a composition containing urea and sulfuric acid in which the molar ratio of said urea to said sulfuric acid is within the range of about 1 to about 2 and wherein at least a portion of said urea and sulfuric acid is present as the monourea adduct of sulfuric acid.

54. A method for reducing an oxide of nitrogen, which method comprises the step of contacting said oxide of nitrogen with a composition containing urea and sulfuric acid in which the molar ratio of said urea to said sulfuric acid is within the range of about 1 to about 2, and said urea and said sulfuric acid, in combination, constitute at least about 60 weight percent of said composition and wherein at least a portion of said urea and sulfuric acid is present as the monourea adduct of sulfuric acid.

55. A method for reducing an oxide of nitrogen, which method comprises contacting said oxide of nitrogen with a composition comprising urea and sulfuric acid in which the molar ratio of said urea to said sulfuric acid is below 2, and said composition is characterized by an $H_2O/(urea+H_2SO_4)$ molar ratio below 2.5 and wherein at least a portion of said urea and sulfuric acid is present as the monourea adduct of sulfuric acid.

56. A method for reducing an oxide of nitrogen, which method comprises the step of contacting said oxide of nitrogen with a composition comprising urea and sulfuric acid, in which composition the molar ratio of said urea to said sulfuric acid is below 2, said composition contains less than about 1 weight percent water based on the combined weight of said urea and said sulfuric acid, said urea and said sulfuric acid, in combination, constitute at least about 5 weight percent of said composition, and said oxide of nitrogen is contacted with said composition at a temperature of at least about 90° C. and wherein at least a portion of said urea and sulfuric acid is present as the monourea adduct of sulfuric acid.

* * * * *